United States Patent [19]

Tamaoki

[11] Patent Number: 4,868,849
[45] Date of Patent: Sep. 19, 1989

[54] TELEPHONE CARD AND TELEPHONE CARD-OPERATED TELEPHONE

[75] Inventor: Ryokichi Tamaoki, Kasugai, Japan

[73] Assignees: Pitsuko Funaki; Izuna Funaki; Ayano Funaki, all of Nagoya, Japan; part interest to each

[21] Appl. No.: 211,990

[22] Filed: Jun. 27, 1988

[51] Int. Cl.⁴ .......................................... H04M 1/276
[52] U.S. Cl. .................................... 379/357; 379/355
[58] Field of Search ............... 379/216, 354, 355, 357, 379/359, 40, 51

[56] References Cited

U.S. PATENT DOCUMENTS 3,870,830 3/1975 Tapiei .......................... 379/357 X

FOREIGN PATENT DOCUMENTS 0140760 8/1984 Japan ................................ 379/357

Primary Examiner—James L. Dwyer
Attorney, Agent, or Firm—Lynn L. Augspurger

[57] ABSTRACT

A telephone card includes a remaining call number recording area for recording a number of remaining calls which can be made using the card, and a telephone number storage area for storing a telephone number of a party to be called using the card. The card is inserted into a telephone set to automatically call a telephone set corresponding to the telephone number stored in the telephone number storage area. A telephone set capable of using this telephone card includes a reader for reading information stored on the card, a dialing unit for extracting telephone number information, which is indicative of a telephone number of a party to be called, contained in the read information, and for producing a telephone number signal corresponding to the extracted telephone number and transmitting the telephone number signal on a connecting line, a counter for counting a number of calls made using the card, and a writing unit for subtracting the counted number of calls from a remaining number of calls read in from the card at the end of a call, and for writing the result in the remaining call number storage area of the card. By inserting the card in the telephone set, the party whose phone number is recorded on the card is called automatically.

12 Claims, 4 Drawing Sheets

TELEPHONE CARD AND TELEPHONE CARD-OPERATED TELEPHONE

BACKGROUND OF THE INVENTION

This invention relates to a telephone card and a telephone card-operated telephone So-called telephone cards storing a prescribed prepaid amount of a telephone fee have recently become widespread. By inserting such a telephone card in a specially adapted telephone capable of using the card, a conversation can be conducted for an amount of time allowed by the stored fee When a telephone card is used, a service fee is calculated based on the length of the call and distance, a running total of the calculated service feeds is calculated, and the number of remaining calls that can be made using the card is calculated at the end of each conversation The calculated number is equivalent to to the number of times a conversation is possible with the card and is used to update a remaining call number storage area of the card.

Therefore, in comparison with conventional telephones which do not dispense change when calculations are performed in 100 yen units for long-distance calls, card-operated telephones are easier to use, especially since the user need not prepare small change each time.

These telephone cards also serve as a medium for advertisements. That is, the name of a company and advertising slogans are printed on the cards, which are then distributed among customers.

At taxi companies and companies which make it their business to take orders by telephone and deliver the ordered items to their customers, telephones cards are distributed among these customers and the customers are requested to use the cards when telephoning to make an order or to hire a taxi, etc. In such cases, the company name and the related advertisements are merely printed on the surface of the card. When a customer wishes to place an order with the company, the customer must take the trouble to dial or punch in the company telephone number each time.

SUMMARY OF THE INVENTION

Accordingly, an object of the present invention is to provide a telephone card which, when a call is to be placed to a desired party, enables the party to be called automatically without requiring the input of a telephone number.

Another object of the present invention is to provide a card-operated telephone capable of using such a telephone card.

In accordance with the present invention, the former object is attained by providing a telephone card comprising a remaining call number recording area for recording a number of remaining calls which can be made using the card, and a telephone number storage area for storing a telephone number of a party to be called, the card being inserted into a telephone device to automatically call a telephone device corresponding to the telephone number stored in the telephone number storage area.

In accordance with the present invention, the latter object is attained by providing a telephone card-operated telephone comprising reading means for reading information stored on a telephone card, dialing means for extracting telephone number information, which is indicative of a telephone number of a party being called, contained in the read information, and for producing a telephone number signal corresponding to the extracted telephone number and transmitting the telephone number signal on a connecting line, counting means for counting a number of calls made using the telephone card, and writing means for subtracting the counted number of calls from a remaining number of calls read in from the telephone card at the end of a call, and for writing the result in a remaining call number storage area of the telephone card.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An embodiment of the present invention will now be described in detail with reference to the drawings.

Figure 1:
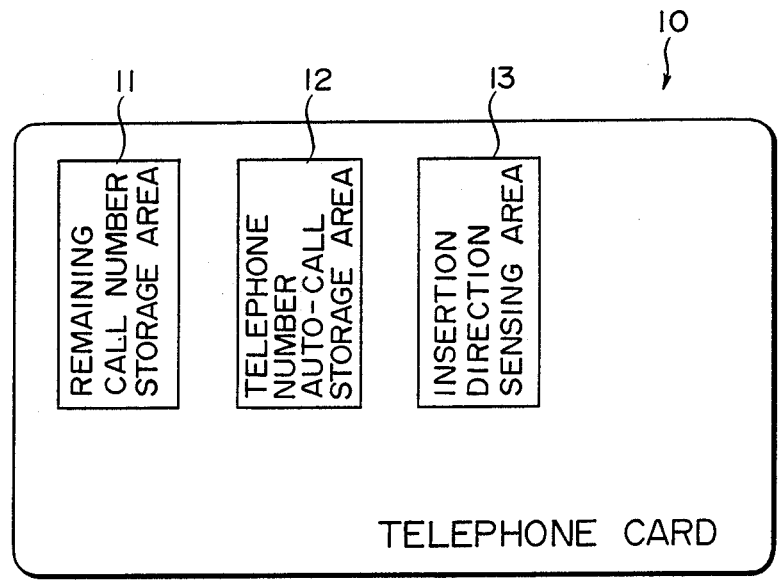
FIG. 1 is a view schematically illustrating a telephone card embodying the present invention.

FIG. 1 is a view schematically illustrating a telephone card 10 embodying the present invention. The telephone card 10 comprises a remaining call number storage area 11, a telephone number storage area 12 for automatic calling, and an insertion direction sensing area 13.

Figure 2:
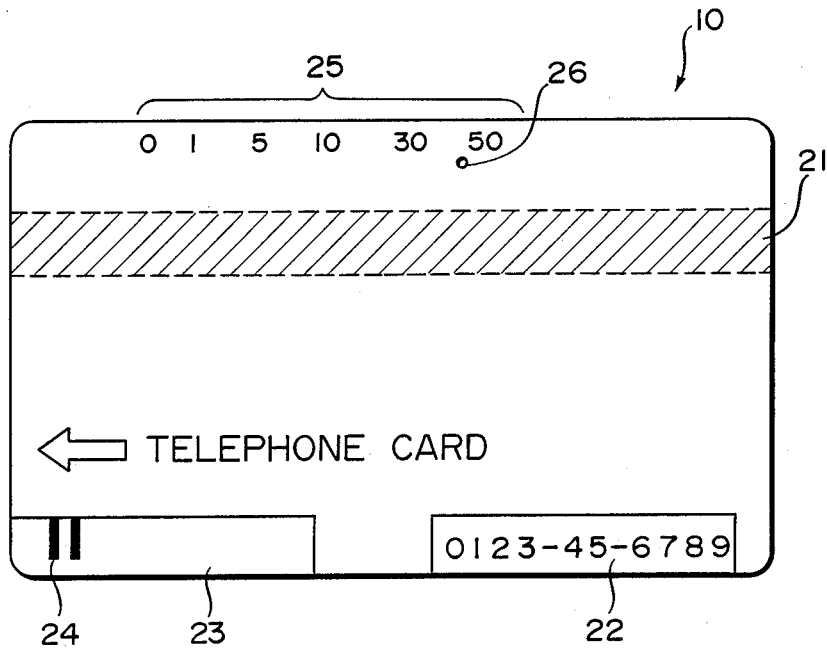
FIG. 2 is a plan view showing the external appearance of a telephone card embodying the present invention.

A plan view showing the external appearance of the telephone card of FIG. 1 is illustrated in FIG. 2. Numeral 21 denotes a remaining call number storage area for recording a remaining number of calls which can be made using the card, the area comprising a magnetic stripe on which a strongly magnetic body is disposed. Numeral 22 denotes an automatic call telephone number storage area indicating a telephone number which can be called automatically. Numeral 23 denotes an insertion direction sensing area indicating a mark 24 for sensing insertion direction. Numeral 25 denotes an area showing a criterion indicative of the remaining number of times calls can be made. A hole corresponding to this number is punched in the card, as at numeral 26.

In the above arrangement, the automatic call telephone number storage area 12 can be provided on the magnetic stripe 21 and can store information magnetically in the same manner as the remaining call number storage area 11.

Figure 3:
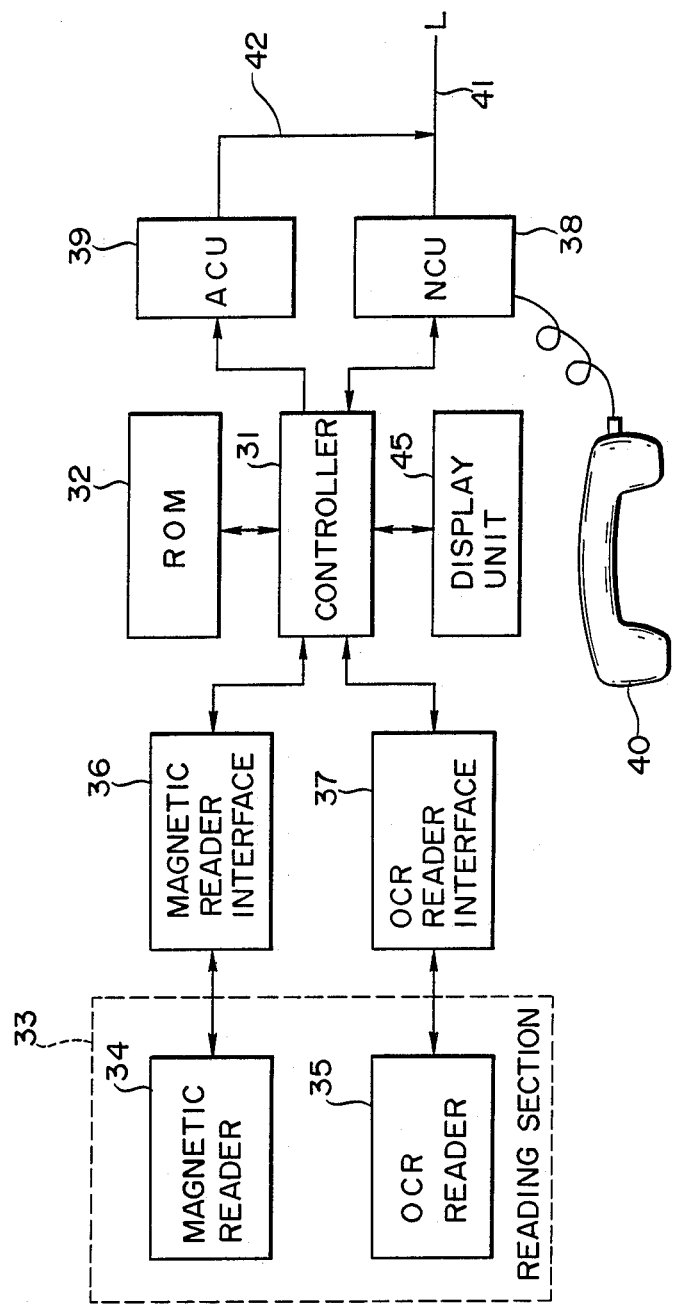
FIG. 3 is a block diagram illustrating a telephone device in which the telephone card of the invention is used.

FIG. 3 is a block diagram illustrating a telephone device capable of using the telephone card 10 constructed as set forth above.

In FIG. 3, the telephone device includes a controller 31 for administering overall control of the embodiment in accordance with a control sequence stored in a ROM 32, and a reading section having a magnetic reader 34 for reading magnetic recording information recorded on the magnetic stripe of the telephone card, and an OCR reader 35 for reading the mark 24 and the telephone number 22 on the card. Provided on the front panel of the telephone device is a slot (not shown) leading to the reading section 33. By inserting the telephone card 10 into the slot, the card is conveyed to the reading section by card feed means, not shown. The telephone device also includes a magnetic reader interface 36 for interfacing the controller 31 with the magnetic reader 34, an OCR reader interface 37 for interfacing the controller 31 with the OCR reader 35, a network control unit (NCU) 38 for interfacing the telephone device with a main wire 41, an automatic calling unit (ACU) 39 for transmitting a telephone number signal (DTMF signal or a dial pulse signal) to the main wire 41 in accordance with a command from the controller 31, a telephone receiver 40, and a display unit for displaying the remaining number of calls which can be made, etc.

Figure 4:
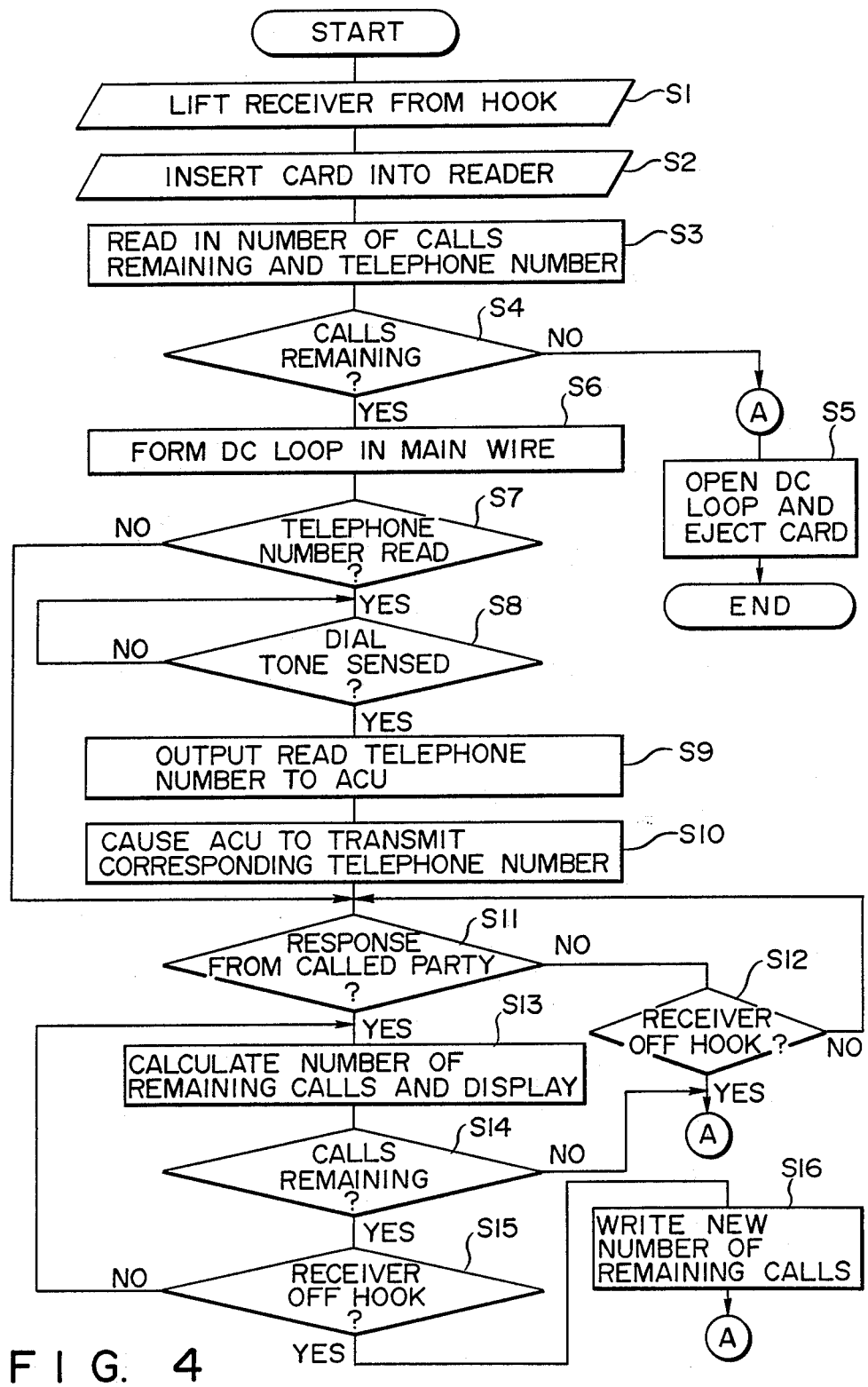
FIG. 4 is a flowchart illustrating control of telephone transmission in the present embodiment.

A call operation using the apparatus of the invention constructed as set forth above will now be described with reference to the flowchart of FIG. 4.

When a call is to be made, the telephone receiver 40 is removed from the hook of the telephone device at a step S1. Next, the telephone card 10 of the present embodiment is inserted into the telephone device through the slot (not shown) at a step S2. When this is done, the card feeding means (not shown) conveys the card 10 to the reading section 33, where the number of calls remaining on the card 10 is read in by the magnetic reader 34 while the telephone number and card insertion direction are read in by the OCR reader 35. The number of calls remaining on the card 10 is checked at a step S4. If the number is zero, a call cannot be placed and a warning tone is issued, after which the program proceeds to a step S5. If a DC loop has been formed in the telephone line, a command is sent to the NCU 38 to open the DC loop, restore the line and eject the inserted card from the slot by the card feeding means. If it is found at the step S4 that calls can still be made using the card, the program proceeds to a step S6, at which a DC loop is formed in the main wire 41 to enable communication. This is followed by a step S7, at which it is determined whether a telephone number has been read by the OCR reader 35. If a telephone number has been read, the program proceeds to a step S8, at which the system waits for a dial tone from the telephone office equipment. When the dial tone arrives, the read telephone number is outputted to the ACU 39 at a step S9. Upon receiving the telephone number, the ACU 39 verifies the dial tone from the telephone office equipment at a step S10 and transmits the corresponding telephone number signal 42 to the main wire 41. The caller then waits for a response from the called party at a step S11. If the other party is busy or does not answer, the telephone receiver is hung up. The controller 31 senses this at a step S12 and the program proceeds to the step S5.

If the called party answers at the step S11, then the program proceeds to a step S13, at which the number of calls is diminished based on the number of remaining calls read from the card 10. The result, namely the number of calls which can be made from now on, is displayed on the display unit 45. Next, the number of remaining calls is checked at a step S14. If calls can no longer be made (i.e. if the remaining number is found to be zero), then the program proceeds from the step S14 to the step S5.

If it is found at the step S11 that calls still remain, the program proceeds from the step S14 to a step S15, at which it is determined whether the caller has lifted the receiver 40 from the hook. If the decision rendered is YES, the program proceeds to a step S16, at which the calculated number of remaining calls is written in the remaining call storage area 11 of telephone card 10 as the new remaining number of calls. The program then proceeds to the step S5.

If the receiver is not lifted from the hook at the step S15, the program returns to the step S13. Here the number of remaining calls becomes zero or it is determined that the caller has hung up the receiver 40 and ended the call.

Figure 5:
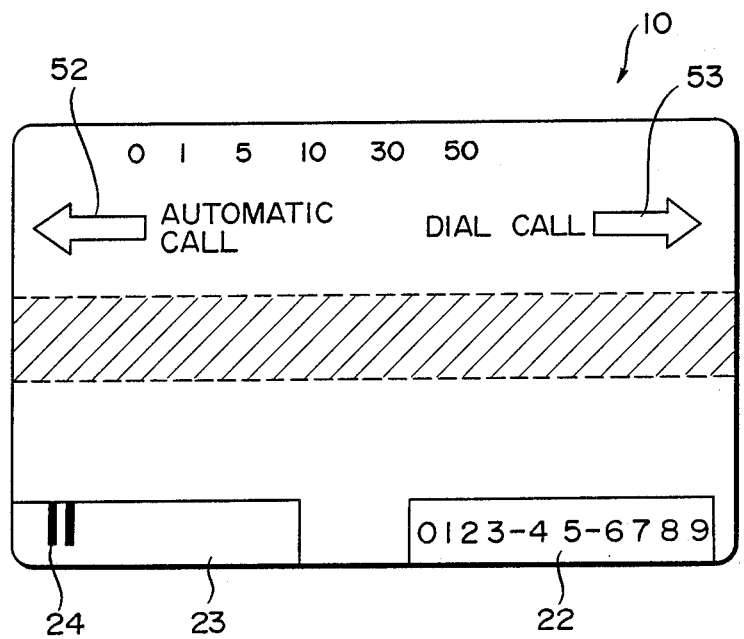
FIG. 5 is a plan view showing the external appearance of another embodiment of a telephone card according to the present invention.

If it is found at the step S7 that telephone number information is not contained in the information read in from the card 10, the program proceeds to the step S11. Thus, the automatic telephone number output is not delivered to the ACU 39 and the accompanying automatic telephone number transmission is not made. Instead, the caller inputs the telephone number from the telephone device manually. In other words, the telephone device operates as an ordinary card-operated telephone. In the description given above, the telephone card 10 can be inserted from only one direction (the direction indicated by the arrow in FIG. 2). However, the invention is not limited to this arrangement. For example, the telephone card can be constructed as shown in FIG. 5, in which a magnetic stripe 51 is provided down the approximate center of the card, thus enabling the card reader 34 to read the card regardless of from which end the card is inserted. When the card 10 is inserted in the direction of arrow 52 in FIG. 5, this establishes an automatic transmission mode in which the information in telephone number area 22 is read in. When the card 10 is inserted in the direction of arrow 53 in FIG. 5, this establishes a manual transmission mode in which the telephone number area 22 is not read and the caller dials in the desired telephone number instead. Thus, when a call is to be placed to a party whose number is recorded on the card, the call can be made automatically. If another party is desired to be called, the call is made manually. It should be noted that the invention is not limited to a case where a telephone number is recorded in the area 22. It is possible to adopt an arrangement in which a telephone number is written on the stripe 51, with control being carried out such that the data is invalidated depending upon the direction in which the card is inserted.

The present invention as described above can find use at companies such as taxi companies where services are rendered upon receiving a call from a customer, at shops such as take-out food shops that deliver goods upon receiving an order by telephone, and at any place of business where transactions are made by orders received by telephone. In cases such as these, a larger number of orders can be received without burdening a customer with the use of cash by distributing the telephone cards among customers.

By distributing telephone cards in accordance with the invention among its employees and having its employees use the cards when calling from outside the company, an ordinary company can readily keep track of telephone fees. It will also be unnecessary for the employees to dial in the phone number each time and to keep change on hand.

Thus, in accordance with the invention as described above, there are provided an easy-to-use telephone card and a card-operated telephone set in which calls can be placed to a desired party automatically without inputting the telephone number each time.

At companies such as taxi companies where services are rendered upon receiving a call from a customer and at shops such as take-out food shops that deliver goods upon receiving an order by telephone, a larger number of orders can be received without burdening a customer with the use of cash by distributing telephone cards in accordance with the invention among customers.

As many apparently widely different embodiments of the present invention can be made without departing from the spirit and scope thereof, it is to be understood that the invention is not limited to the specific embodiments thereof except a defined in the appended claims.

What is claimed is:

1. A telephone card comprising:
   a card, said card having information storage means located on said card,
   said information storage means including a remaining call number recording area for recording a number of remaining calls which can be made using the card; and
   said information storage means further including a telephone number storage area for storing a telephone number of a party to be called;
   said telephone number being stored on said card in machine readable form in said telephone number storage area such that when the card is inserted into a sending telephone device in one direction said telephone number may be read by said telephone device into which said card is inserted to automatically call a receiving telephone device corresponding to the telephone number stored in said telephone number storage area, and
   said card also carrying predetermined machine readable card enable means for enabling a call to be placed from said sending telephone device after said card is inserted therein, said machine readable card enable means including a predetermined enable mark which may be detected as an enable mark for either enabling a call to be placed automatically or manually after said card has been inserted into said sending telephone device and read by said sending telephone device.

2. The telephone card according to claim 1, wherein in said remaining call number recording area is located on a strongly magnetic body provided on a surface of the card permitting the number of said remaining calls permitted by said card to be read therefrom as a magnetic record.

3. The telephone card according to claim 1, wherein said telephone number storage area is located on a strongly magnetic body provided on a surface of the card permitting said telephone number for automatic dialing to be stored thereon and read therefrom as a magnetic record.

4. The telephone card according to claim 1, wherein said telephone number storage area visually indicates, on a surface of the card, visually readable symbols corresponding to the stored telephone number.

5. The telephone card according to claim 1, wherein said predetermined enable mark is provided on one edge portion of the card, the direction in which the card is inserted being sensible depending upon whether said mark is read.

6. A telephone card according to claim 1 wherein said predetermined enable mark is located on said card at a position such that dependent upon the presence of said predetermined enable mark and the direction in which the telephone card is inserted said predetermined enable mark may be read for either enabling a call to be placed after a telephone number from said telephone card has been read automatically to a telephone set corresponding to a telephone number read from the card when the card is inserted in said one direction, or enabling a call to be placed to a telephone set specified by manual dialing without automatic dialing being performed, when the card is inserted in a direction other than said one direction.

7. A telephone card according to claim 1 wherein said card enable means permits manual dialing in the event that no read telephone number is detected upon reading of said telephone number storage area by said telephone device.

8. A telephone card-operated telephone set comprising reading means for reading information stored on a telephone card;
   dialing means for extracting telephone number information, which is indicative of a telephone number of a party to be called, contained in the read information, and for producing a telephone number signal corresponding to the extracted telephone number and transmitting the telephone number signal on a connecting line;
   counting means for counting a number of calls made using the telephone card; and
   writing means for subtracting the counted number of calls from a remaining number of calls read in from the telephone card at the end of a call, and for writing the result in a remaining call number storage area of the telephone card, and wherein
   a direction in which the telephone card is inserted is sensed based upon whether a predetermined mark provided on one edge portion of the telephone cars has been read, a call being placed automatically to a telephone set corresponding to a read telephone number when the card is inserted in one direction, a call being placed to a telephone set specified by manual dialing without automatic dialing being performed, when the card is inserted in a direction other than said one direction.

9. The telephone set according to claim 8, wherein said reading means reads stored information from said card which has been magnetically recorded on a strongly magnetic body provided on a surface of the said telephone card.

10. The telephone set according to claim 8, wherein said reading means reads from said card at least one visible symbol provided on a surface of the said telephone card.

11. The telephone set according to claim 8, wherein a direction in which the telephone card is inserted is sensed based upon whether a predetermined mark provided on one edge portion of the telephone card has been read, a call being placed automatically to a telephone set corresponding to a read telephone number when the card is inserted in one direction, a call being placed to a telephone set specified by manual dialing, without automatic dialing being performed, when the card is inserted in a direction other than said one direction.

12. A telephone card comprising:
    a card, said card having information storage means located on said card for storing a telephone number dial code, said telephone number dial code being stored on said card in machine readable form in a telephone number storage area such that when the card is inserted into a telephone device said telephone number dial code may be read by said telephone device into which said card is inserted for initiating a call automatically to another telephone coupled device, and said card also carrying predetermined machine readable and enable means for enabling a call to be placed from a telephone device after said card is inserted therein, said machine readable card enable means including a machine readable predetermined enable means which may be detected for either enabling automatic entry of a telephone number dial code of said stored telephone number into the telephone system or manual dialing entry of numbers by a manual dial code being manually entered after said card has been inserted into said telephone device and read by said telephone device;

wherein said predetermined enable means is located on said card at a position such that dependent upon the presence of said predetermined enable means and the direction in which the telephone card is inserted said predetermined enable means may be read for either enabling a call to be placed after a telephone number from said telephone card has been read to automatically connect through the telephone system a call to a telephone set corresponding to a read telephone number when the card is inserted in said one direction, or enabling a call to be placed to a telephone set specified by manual dialing without automatic dialing being performed, when the card is inserted in a direction other than said one direction.

* * * * *